United States Patent Office 3,743,729
Patented July 3, 1973

3,743,729
COMBATING FUNGI WITH CHLOROALKYLTHIOL PHOSPHORIC ACID ESTERS AND ESTER AMIDES
Hellmut Hoffmann, Wuppertal-Elberfeld, and Hans Scheinpflug, Leverkusen, Germany, assignors to Bayer Aktiengesellschaft, Leverkusen, Germany
No Drawing. Original application May 8, 1968, Ser. No. 727,697, now Patent No. 3,591,663. Divided and this application Nov. 12, 1970, Ser. No. 89,044
Claims priority, application Germany, May 10, 1967, F 52,369
Int. Cl. A01n 9/36
U.S. Cl. 424—225                     9 Claims

ABSTRACT OF THE DISCLOSURE

O-chloroalkyl-S-(alkyl, cycloalkyl, phenyl and chloro-, alkyl-, nitro- and/or alkylmercapto- -substituted phenyl)- [O- and S-(alkyl, cycloalkyl, phenyl and chloro-, alkyl-, nitro- and/or alkylmercapto- -substituted phenyl) as well as N-alkyl and N,N-dialkyl]-thiol and -dithiol-phosphoric acid esters and -thiol-phosphoric acid ester amides, which possess fungicidal properties.

---

This application is a division of application Ser. No. 727,697, filed May 8, 1968, now Pat. 3,591,663.

The present invention relates to and has for its objects the provision for particular new chloroalkyl-thiol-phosphoric acid esters and ester amides which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

In U.S. Pat. 2,690,450, there are described thiol-phosphoric acid aryl esters which possess parasiticidal properties which are especially insecticidal but also fungicidal. From this patent, however, it is only clear that these compounds are suitable for the control of brown rot (*Sclerotinia fructicola*) and early blight (*Alternaria solani*). It cannot be derived from U.S. Pat. 2,690,450, however, whether the compounds disclosed therein possess also a practically adequate effectiveness against fungal pathogenic agents on rice plants, especially the fungus *Piricularia oryzae*.

It has been found in accordance with the present invention that the particular new chloroalkyl-thiol-phosphoric acid esters and ester amides, having the formula

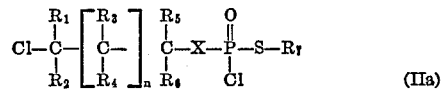

(I)

in which $R_1$, $R_2$, $R_3$, $R_4$, $R_5$ and $R_6$, each respectively, is selected from the group consisting of hydrogen, alkyl and haloalkyl having 1–4 carbon atoms, $R_7$ and $R_8$, each respectively, is selected from the group consisting of alkyl having 1–6 carbon atoms, cycloalkyl having 5–6 ring carbon atoms, phenyl and substituted phenyl which is substituted with 1–3 substituents selected from the group consisting of chloro, bromo, lower alkyl, nitro, lower alkyl mercapto, and mixtures of such substituents, X is oxygen, Y is selected from the group consisting of oxygen and sulfur, and $n$ is a whole number from 0 to 1, with the proviso that Y and $R_8$ when taken together represent an amino group selected from the group consisting of N-lower alkyl and N,N-di-lower alkyl amino, exhibit strong fungicidal properties.

It has been furthermore found in accordance with the present invention that a versatile and smooth process for the production of the particular new chloroalkyl-thiol-phosphoric acid esters and ester amides of Formula I above in favorable yields may be provided, which comprises reacting an O-chloroalkyl-S-(alkyl, cycloalkyl, phenyl or substituted phenyl)-thiol-phosphoric acid diester chloric having the formula

(IIa)

in which $R_1$, $R_2$, $R_3$, $R_4$, $R_5$, $R_6$, $R_7$, X and $n$ are the same as defined above, with the appropriate alcohol, mercaptan, phenol, thiophenol, N-alkylamide or N,N-dialkylamide having the formula $$H\text{—}Y\text{—}R_8 \qquad (\text{IIb})$$

in which Y and $R_8$ are the same as defined above, as second component, or with the corresponding salt of such second component, e.g. alkali metal (Na, K, etc.) or ammonium salt.

Advantageously, the particular new chloroalkyl-thiol-phosphoric acid esters and ester amides of the present invention are distinguished by outstanding fungitoxic properties, in particular against fungal pathogenic agents on rice plants. Surprisingly, the instant compounds are in this respect clearly superior to the known active compounds of analogous constitution which have been suggested for this purpose. The instant new active compounds, therefore, represents a genuine enrichment of the art.

If, for example, O-[3-chlorobutyl-(2′]-S-[4′-chlorophenyl]-thiol-phosphoric acid diester chloride and methanol are used as starting materials, the course of the production process of the present invention can be illustrated by the following reaction scheme:

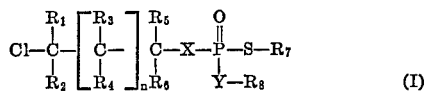

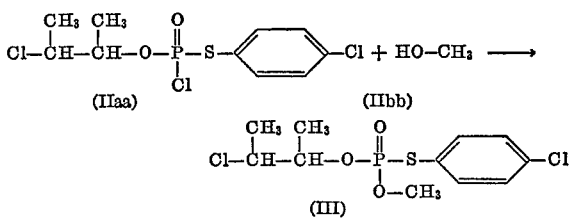

The O-chloroalkyl-S-(alkyl, cycloalkyl, phenyl and substituted phenyl)-thiol-phosphoric acid diester chlorides usable as starting materials, as well as the alcohols, mercaptans phenols, thiophenols, N-alkylamines and N,N-dialkylamines, are generally defined by the Formulae IIa and IIb above.

As typical examples of the O-chloroalkyl-S-(alkyl, cycloalkyl, phenyl and substituted phenyl)thiol-phosphoric acid diester chlorides of Formula IIa, may be listed:

O-(2-chloroethyl)-S-methyl;
O-(2-chloroethyl)-S-[1,1-dimethyl-eth-1-yl];
O-(2-chloroethyl)-S-(4′-methyl-phenyl);
O-(2-chloroethyl)-S-(4′-chlorophenyl);
O-[3-chlorobut-2-yl]-S-(2′-nitrophenyl);
O-[3-chlorobut-1-yl]-S-methyl;
O-[1,3-dichloroprop-2-yl]-S-(4′-chlorophenyl);
O-[3-chlorobut-2-yl]-S-methyl;
O-[3-chlorobut-2-yl]-S-(4′-methylphenyl);
O-[1-chloro-prop-2-yl]-S-methyl;
O-[1-chloroprop-2-yl]-S-methyl;
O-(2-chloroethyl)-S-(2′-nitrophenyl);
O-(2-chloroethyl)-S-phenyl;
O-[3-chlorobut-2-yl]-S-4′-(chlorophenyl)-

-thiol-phosphoric acid diester chloride, and the like.

Some of the O-chloroalkyl-S-(alkyl, cycloalkyl, phenyl and substituted phenyl)-thiol-phosphoric acid diester chlorides of the general Formula IIa are known from the literature. Thus, for example, the appropriate O-chloroalkyl-thiol-phosphoric acid diester chlorides can be prepared by reaction of O,O-dialkyl-phosphorous acid diester chlorides (i.e. dialkyl-chlorophosphites chlorinated in one of the alkyl radicals) with sulfenic acid chlorides according to the method of K. A. Petrov, G. A. Sokolskij and B. M. Polees, Z. Obsc. Chim. 26, 3381 [1956].

According to U.S. application Ser. No. 704,515, filed Feb. 12, 1968, now abandoned, for example, chloroalkyl-S-alkyl- or -aryl-(di)thiol-phosphoric acid diester or ester amide chlorides, including appropriate starting compounds of the type covered by Formula IIa hereinabove, are obtained with very good yields as well as in outstanding purity by reaction of equimolar amounts of 2-chlorophospholanes or -phosphorinanes having the formula

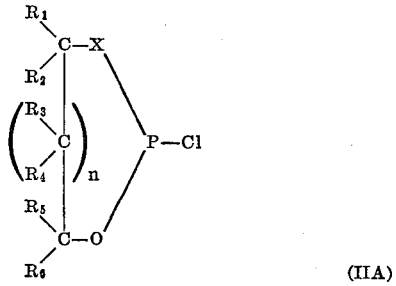

(IIA)

in which, inter alia, the radicals $R_1$, $R_2$, $R_3$, $R_4$, $R_5$, $R_6$, X and $n$ include the corresponding radicals defined hereinabove for Formula I, with appropriate aliphatic or aromatic sulfenic acid chlorides having the formula

(IIB)

in which, inter alia, the radical $R_7$ includes radicals of the type defined hereinabove for Formula I.

The reaction for producing the diester chlorides used as starting materials herein can be carried out in the presence or absence of solvents (including mere diluents) such as (optionally chlorinated) aliphatic and aromatic hydrocarbons, ethers or low-molecular-weight ketones and nitriles at temperatures from about —20 to +50° C., preferably at —10 to +30° C.

It is expedient to add the sulfenic acid chloride (if desired, diluted with one of the above-mentioned solvents) dropwise to the solution or suspension of the phospholane or phosphorinane derivative (preferably at the said temperatures, with stirring and possibly with cooling of the reaction mixture). After completion of the addition, the mixture is left to stand (for example for about 1 to 3 hours) in order to complete the reaction, the solvent is then removed and the residue is optionally subjected to fractional distillation under reduced pressure. However, with the method of working described, the starting materials are in most cases already obtained in such high purity that their further reaction is possible without purification. These products may thus be used as starting materials for the production process of the present invention.

According to a particular method of carrying out the production process of the present invention, the O-chloroalkyl-S-(alkyl, cycloalkyl, phenyl or substituted phenyl) thiol-phosphoric acid diester chloride concerned is not isolated after its production, but instead the reaction product of the above-mentioned 2-chloro-phospholane or -phosphorinane and of the appropriate sulfenic acid chloride is caused to react immediately with the alcohol, mercaptan, phenol, thiophenol or amide of Formula IIb in a one-pot process.

Otherwise, the process according to the instant invention preferably also is carried out in the presence of solvents or diluents. As such, practically all inert organic solvents are suitable, but particularly good results have been obtained with aliphatic and aromatic hydrocarbons (optionally chlorinated), such as methylene chloride, dichloroethane, di-, tri- or tetrachloroethylene, chloroform, carbon tetrachloride, benzine, benzene, chlorobenzene, toluene or xylene; ethers, for example diethyl or di-n-butyl ether, dioxan, tetrahydrofuran; low molecular weight aliphatic ketones or nitriles, for example acetone, methylethyl, methylisopropyl ketone or methylisobutyl ketone, acetonitrile or propionitrile, and the like.

Furthermore, the alcohol, mercaptan, phenol, thiophenol or amine starting material can be reacted in the form of its salts, preferably the appropriate alkali metal salt (Na, K) or ammonium salt. Finally, instead of this, it is also possible to work in the presence of an acid-binding agent.

As acid-binding agents, there may be used for example the usual acid acceptors, alkali metal carbonates, alcoholates or hydroxides (for example, potassium or sodium carbonate, methylate, ethylate or hydroxide), tertiary aliphatic, aromatic or heterocyclic bases such as triethylamine, dimethylaniline, benzyldimethylamine or pyridine.

The reaction temperatures of the production process of the present invention can be varied within a fairly wide range. In general, the reaction is carried out at from substantially about 20 to 100° C. (or the boiling point of the mixture), preferably at 25 to 80° C.

For carrying out the process of the present invention, there is theoretically necessary, as can be seen from the above reaction equation, 1 mol of alcohol, mercaptan, phenol, thiophenol or amine per mole of O-chloroalkyl-S-(alkyl, cycloalkyl, phenyl or substituted phenyl)-thiolphosphoric acid diester chloride. Usually, equimolar amounts of the starting materials are used, but an excess of the second reactant may sometimes be advantageous; this excess may then serve as solvent. It has proved expedient either to add dropwise, with stirring, the O-chloroalkyl-S-(alkyl, cycloalkyl, phenyl or substituted phenyl)-thiol-phosphoric acid diester chloride to the solution or suspension of the alcohol, mercaptan, phenol, thiophenyl or amine in one of the above-mentioned solvents or, conversely, to add the hydroxyl-group-containing or sulfohydryl-group-containing compound of Formula IIb to the diester chloride (or to the above described reaction product of the appropriate 2-chloro-phospholane or -phosphorinane derivative and sulfenic acid chloride).

After combining the starting components, the reaction mixture is left to stand in order to complete the reaction, for example for 1 to 3 hours, and/or subsequently heated to the above-mentioned temperatures for several hours (for example overnight), with stirring.

The working up of the mixture may be effected in a manner known in principle by pouring out the mixture into ice water, optionally de-acidifying the solution, taking up the separated reaction product (which in most cases is in oily form) in a water-immiscible solvent, preferably one of the above-mentioned hydrocarbons, for example benzene, washing the organic layer until there is a neutral reaction, separating the phases, drying the solution, distilling off the solvent and, if possible, fractional distillation of the residue under reduced pressure.

The instant new products of the present process are obtained in most cases in the form of colorless to slightly yellow-colored viscous oils, some of which can be distilled under greatly reduced pressure without decomposition. If this is not possible, the compounds obtainable by the instant process can, for the purpose of purification, be slightly distilled, that is freed from the last volatile impurities by longer heating to slightly to moderately elevated temperatures in a vacuum.

As already mentioned above, the particular new active compounds of the present invention are distinguished by a strong fungitoxic effectiveness and a broad spectrum of activity. Surprisingly, they possess, despite this outstanding activity against phytopathogenic fungi, only a slight toxicity to warm-blooded animals (median toxicity $DL_{50}$ in the rat per os 100 to 1000 mg./kg. animal). To this there is to be added the excellent compatibility of the instant active compounds with the higher plants. By reason of these properties, the instant active compounds are eminently suitable as plant protection agents against fungal diseases. Fungicides based on these active compounds can be used for the control of fungi of the most widely different classes, for example Archimycetes, Phycomycetes, Ascomycetes, Basidiomycetes, Fungi Imperfecti, and the like. The instant active compounds have, however, given particularly good results against fungal diseases of rice, in particular those caused by the fungus *Piricularia oryzae*. The instant active compounds have an excellent protective and curative effect against this fungus.

Furthermore, the instant compounds can also be used for the control of further fungal pathogenic agents in rice and other cultivated plants. Such new compounds of the present invention possess a particular activity against the following species of fungi: *Corticium sasakii, Cochliobolus miyabeanus*, Mycosphaerella species, *Corticium* species, *Cerospora* species, *Alternaria* species, *Botrytis* species, and the like.

Moreover, the instant active compounds, which can be prepared according to the stated process, show a very good activity against fungi which attack the plant from the soil and some of which cause Tracheomycoses, such as *Fusarium cubense, Fusarium dianthi, Verticillium alboatrum, Phialophora cinerescens*, and the like.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers including organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other fungicides, herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is persent in an amount substantially between about 0.1–95%, and preferably 0.5–90%, by weight of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a dispersible carrier vehicle such as (1) a dispersible carrier solid, and/or (2) a dispersible carrier liquid preferably including a carrier vehicle assistant, e.g. surface-active agent, such as an emulsifying agent and/or a dispersing agent, and an amount of the active compound which is effective for the purpose in question and which is generally about 0.00001–95%, and preferably 0.01–95%, by weight of the mixture.

In particular, the present invention contemplates methods of selectively controlling or combating fungi, which comprises applying to at least one of (a) such fungi and (b) their habitat, i.e. the locus to be protected, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

The instant compounds also can be used by the so-called ultra-low-volume process with favorable success, i.e. using formulations containing up to 95% by weight of active ingredients or even 100% of the particular active compound alone.

The methods of using the instant compounds are particularly applicable to rice to protect rice from damage, e.g. by growing rice in areas in which immediately prior to and/or during the time of growth a compound in accordance with the invention alone or in admixture with a carrier vehicle has been applied thereto.

It will be realized, of course, that the concentration of the particular active compound utilized in admixture with the carrier vehicle will depend upon the intended application. Therefore, in special cases, it is possible to go above or below the aforementioned concentration ranges.

The outstanding fungitoxic effectiveness of the particular new compounds according to the present invention, as well as their distinct superiority compared with a known product of analogous constitution and the same type of activity, can be seen, by way of illustration and without limitation, from the following experimental test results:

EXAMPLE 1

Piricularia test: Liquid preparation of active compound

Solvent: 1 part by weight of acetone.
Dispersing agent: 0.05 part by weight of sodium oleate.
Additive: 0.2 part by weight of gelatin.
Water: 98.75 parts by weight of water.

The amount of the particular active compound required for the desired concentration thereof in the spray liquor is mixed with the stated amount of solvent, and the concentrate is diluted with the stated amount of water containing the stated additive.

Test for protective action 30 rice plants about 14 days old are sprayed with the spray liquor until dripping wet. The plants remain in a greenhouse at temperatures of 22–24° C. and a relative atmospheric humidity of about 70% until they are dry. They are then inoculated with an aqueous suspension of 100,000 to 200,000 spores/ml. of *Piricularia oryzae* and placed in a chamber at 24–26° C. and 100% relative atmospheric humidity.

5 days after inoculation, the infestation of all the leaves present at the time of inoculation is determined as a percentage of the untreated but also inoculated control plants. 0% means no infestation; 100% means that the infestation is exactly as great as in the case of the control plants.

The particular active compounds, their concentrations and the results obtained can be seen from the following Table 1.

Test for curative action

This differs from the test for protective action in that the active compounds are applied not before, but only 16 hours after, the inoculation. Substances which show an activity when the test is conducted in this manner are in a position to kill the fungus after infection and thereby to exercise a curative action. The results of this test can also be seen from Table 1.

TABLE 1.—PIRICULARIA TEST (LIQUID PREPARATION OF ACTIVE COMPOUND)

| Active compound (constitution) | | Infestation as a percentage of the infestation of the untreated control with a concentration of active compound (in percent) | | |
|---|---|---|---|---|
| | | 0.05 | 0.025 | 0.01 |
| (A) 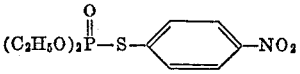 (Comparative preparation known from U.S. Patent 2,690,450.) | Pr. | 18 | 50 | 100 |
| (III₁) 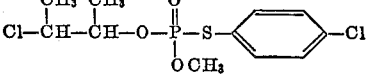 | Pr. Cur. | 0 38 | 4 | |
| (IV₁) 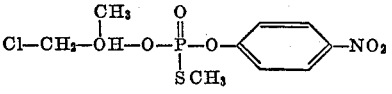 | Pr. Cur. | 0 13 | 8 | |
| (V₁) 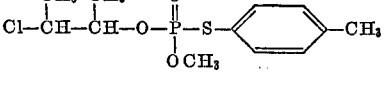 | Pr. Cur. | 0 25 | 13 | |
| (VI₁) 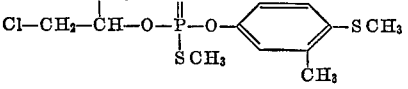 | Pr. | 0 | 8 | |
| (VII)₁ 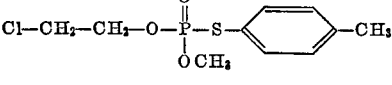 | Pr. | 0 | 0 | |
| (VIII₁) 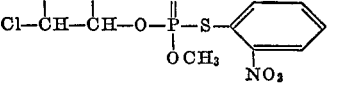 | Pr. Cur. | 4 29 | 17 | |
| (IX₁) 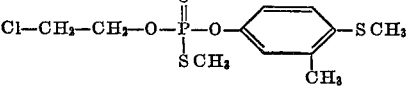 | Pr. | 25 | 35 | |
| (X₁) 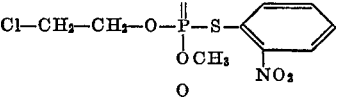 | Pr. | 8 | | |
| (XI₁) 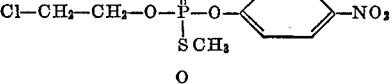 | Pr. | 13 | 33 | |
| (XII₁) 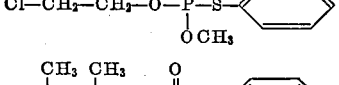 | Pr. | 4 | | 46 |
| (XIII₁) 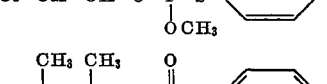 | Pr. Cur. | 0 8 | 0 | |
| (XIV₁) 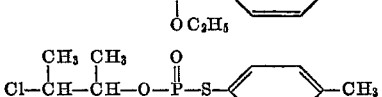 | Pr. Cur. | 0 21 | 0 | |
| (XV₁) 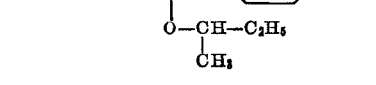 | Pr. | 4 | 33 | |

TABLE 1—Continued

| Active compound (constitution) | | Infestation as a percentage of the infestation of the untreated control with a concentration of active compound (in percent) | | |
|---|---|---|---|---|
| | | | 0.05 | 0.025 | 0.01 |
| (XVI₁) | Cl–CH(CH₃)–CH(CH₃)–O–P(=O)(SCH₃)–O–C₆H₄–NO₂ | Pr. | 0 | 0 | |
| (XVII₁) | Cl–CH(CH₃)–CH(CH₃)–O–P(=O)(OC₂H₅)–S–C₆H₄–CH₃ | Pr. | 0 | 0 | |
| (XVIII₁) | Cl–CH₂–CH₂–O–P(=O)(O–C₆H₃(CH₃)(Cl))–S–C₆H₄– | Pr. | 8 | 25 | |
| (XIX₁) | Cl–CH₂–CH₂–CH(CH₃)–O–P(=O)(SCH₃)–O–C₆H₅ | Pr. | 0 | 0 | |
| (XX₁) | Cl–CH₂–CH(CH₃)–O–P(=O)(S–C₆H₅)₂ | Pr. | 0 | 4 | |
| (XXI₁) | Cl–CH₂–CH(CH₃)–O–P(=O)(SCH₃)–O–C₆H₅ | Pr. / Cur. | 0 / 17 | 4 | |
| (XXII₁) | Cl–CH(CH₃)–CH(CH₃)–O–P(N(CH₃)₂)(S–C₆H₄–Cl) | Pr. | 0 | 0 | |
| (XXIII₁) | Cl–CH(CH₃)–CH(CH₃)–O–P(=O)(N(CH₃)₂)–S–C₆H₄–NO₂ | Pr. | 4 | | |
| (XXIV₁) | Cl–CH(CH₃)–CH(CH₃)–O–P(=O)(N(CH₃)₂)–S–C₆H₄–CH₃ | Pr. | 0 | 42 | |

NOTE.—Pr.=protective effect. Cur.=Curative effect.

The following further examples illustrate without ilimtation the process for producing the particular new compounds of the present invention.

EXAMPLE 2

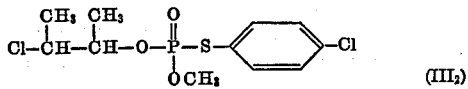

$$(III_2)$$

Preparation takes place without isolation of O-[3-chlorobut-2-yl] - S - [4'-chlorophenyl]-thiol-phosphoric acid diester chloride of the formula

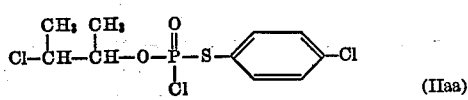

$$(IIaa)$$

178 g. (1 mol) 4-chlorophenyl-sulfenic acid chloride are added at 30° C. to a solution of 154.5 g. (1 mol) 2-chloro-4,5-dimethyl-1,3,2-dioxaphospholane in 300 cc. dichloromethane. After standing for 1 hour at room temperature, 80 cc. (excess) methanol are added to the reaction mixture and it is heated until the cessation of evolution of hydrogen chloride. The mixture is then washed twice with ice water, then once with saturated sodium hydrogen carbonate solution, the organic phase is separated, and drying over sodium sulfate is effected. The residue remaining behind after the solvent has been drawn off is distilled under reduced pressure. The O-methyl-O-[3-chlorobut - 2 - yl]-S-[4'-chlorophenyl]-thiol-phosphoric acid ester boils at 148 to 150° C./0.05 mm. Hg. The yield is 197 g. (60% of the theory).

*Analysis.*—Calcd. for $C_{11}H_{15}Cl_2O_3PS$ (molecular wt. 329) (percent): Cl, 21.6; P, 9.4. Found (percent): Cl, 21.4; P, 9.7.

In analogous manner, when 4-methylphenyl-sulfenic acid chloride is used, O-methyl-O-[3-chlorobut-2-yl]-S-(4'-methylphenyl)-thiol-phosphoric acid ester of the formula

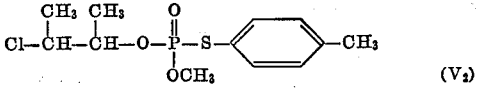

$$(V_2)$$

with the boiling point 160° C. 0.01 mm. Hg is obtained. The yield is 200 g. (65% of the theory).

*Analysis.*—Calcd. for $C_{12}H_{18}ClO_3PS$ (molecular wt. 308.5) (percent): P, 10.0; S, 10.4. Found (percent): P, 9.9; S, 10.9.

EXAMPLE 3

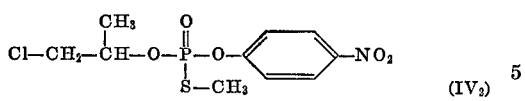
(IV₂)

To a suspension of 160 g. (1 mol) sodium 4-nitrophenate in 200 cc. acetonitrile there are added dropwise 223 g. (1 mol) O-[3-chloroprop-2-yl]-S-methyl-thiolphosphoric acid diester chloride and the mixture is then heated for 12 hours under reflux. Thereafter the reaction mixture is cooled, poured into ice water, and taken up with benzene; the organic layer is extracted with saturated sodium hydrogen carbonate solution and dried. After the benzene has been drawn off under reduced pressure, there remain behind 204 g. (63% of the theory) of O - [1-chloroprop - 2-yl]-S-methyl-O-[4'-nitrophenyl]-thiol-phosphoric acid ester as oily substance.

*Analysis.*—Calcd. for $C_{10}H_{13}ClNO_5PS$ (molecular wt. 325.5) (percent): P, 9.5; N, 4.3. Found (percent): P, 9.2; N, 4.1.

EXAMPLE 4

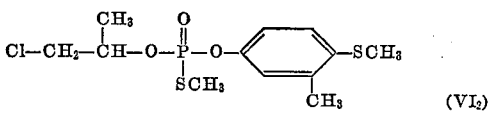
(VI₂)

175 g. (1 mol) sodium 3-methyl-4-methylmercaptophenate are suspended in 600 cc. acetonitrile and to this suspension there are added dropwise 223 g. (1 mol) O-[3-chloroprop - 2 - yl]-S-methyl-thiol-phosphoric acid diester chloride. The mixture is subsequently heated to the boil for 3 hours, then cooled, poured into ice water and extracted with benzene. Finally, the organic phase is separated, then washed with saturated sodium hydrogen carbonate solution; the resulting benzene solution is dried and evaporated under reduced pressure. There remain behind 200 g. (59% of the theory) of O-[3-chloroprop-2-yl]-S-methyl-O-[3'-methyl-4'-methyl-mercapto-phenyl]-thiol-phosphoric acid ester in the form of a viscous oil.

*Analysis.*—Calcd. for $C_{12}H_{18}ClO_3PS_2$ (molecular wt. 340.5) (percent): P, 9.1; S, 18.8. Found (percent): P, 8.7; S, 19.0.

EXAMPLE 5

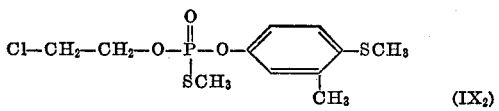
(IX₂)

175 g. (1 mol) sodium 3-methyl-4-methylmercaptophenate and 209 g. (1 mol) O-(2-chloroethyl)-S-methylthiol-phosphoric acid diester chloride are reacted in an analogous manner to the procedure of Example 2. There are obtained 220 g. (67% of the theory) of O-(2-chloroethyl) - S - methyl - O - (3'-methyl-4'-methylmercaptophenyl)-thiol-phosphoric acid ester of the boiling point 128 to 130° C./1. mm. Hg.

The O-(2-chloroethyl)-S-methyl-thiol-phosphoric acid diester chloride used as starting material can be prepared for example as follows:

82.5 g. (1 mol) methylsulfenic acid chloride dissolved in 200 cc. tetrachloromethane are added dropwise at 20 to 30° C. to a solution of 126.5 g. (1 mol) 2-chloro-1,3,2-dioxaphospholane in 200 cc. tetrachloromethane. After completion of the addition, the mixture is left to stand for 1 hour at room temperature, the solvent is drawn off and the residue is distilled. The yield is 200 g. (96% of the theory). The O-(2-chloroethyl)-S-methyl-thiol-phosphoric acid diester chloride boils at 106° C. under a pressure of 1 mm. Hg.

EXAMPLE 6

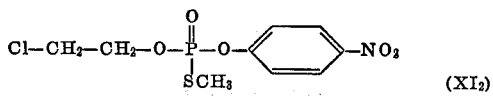
(XI₂)

In a manner analogous to Example 4, by reaction of 160 g. (1 mol) sodium 4-nitrophenate and 209 g. (1 mol) O - (2 - chloroethyl) - S - methyl-thio-phosphoric acid diester chloride there is obtained the O-(2-chloroethyl)-S-methyl-O-(4'-nitrophenyl)-thiol-phosphoric acid ester. The yield is 160 g. (51% of the theory.

*Analysis.*—Calcd. for $C_9H_{11}ClNO_5PS$ (molecular wt. 311.5) (percent): N, 4.5; S, 10.3. Found (percent): N, 4.8; S, 9.6.

EXAMPLE 7

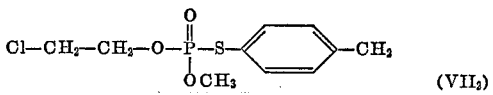
(VII₂)

To a solution of 126.5 g. (1 mol) 2-chloro-1,3,2-dioxaphospholane in 400 cc. dichloromethane there are added dropwise, at 20 to 25° C., 158.5 g. (1 mol) 4-tolylsulfenic acid chloride dissolved in 200 cc. dichloromethane.

After standing for one hour, 100 cc. methanol are added, at room temperature, to the mixture and the latter is heated until the cessation of evolution of hydrogen chloride. The reaction mixture is then washed, first with water, then with saturated sodium hydrogen carbonate solution, the organic phase is separated and evaporated, and the residue is distilled.

The O - (2 - chloroethyl)-O-methyl-S-(4'-tolyl)-thiolphosphoric acid ester boils at 174 to 176° C. under a pressure of 1 mm. Hg. The yield is 208 g. (74% of the theory).

*Analysis.*—Calcd. for $C_{10}H_{14}ClO_3PS$ (molecular wt. 280.5) (percent): P, 11.0; S, 11.4. Found (percent): P, 10.7; S, 12.1.

EXAMPLE 8

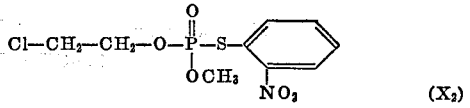
(X₂)

126.5 g. (1 mol) 2-chloro-1,3,2-dioxaphospholane and 189.5 g. (1 mol) 2-nitrophenyl-sulfenic acid chloride are reacted in a manner analogous to that described in the preceding example, using methanol in the second step, and 170 g. (55% of the theory) of O-(2-chloroethyl)-O-methyl-S-(2'-nitrophenyl)-thiol-phosphoric acid ester are obtained in the form of a non-distillable, chromatographically uniform oil.

*Analysis.*—Calcd. for $C_9H_{11}ClNO_5PS$ (molecular wt. 311.5) (percent): N, 4.5; P, 10.0. Found (percent): N, 4.4; P, 9.9.

EXAMPLE 9

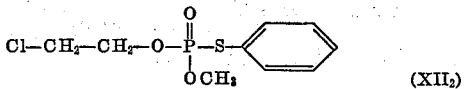
(XII₂)

By reaction of 126.5 g. (1 mol) 2-chloro-1,3,2-dioxaphospholane and 144.5 g. (1 mol) phenylsulfenic acid chloride there is obtained, using methanol in the second step, in a manner analogous to that described in Example 7, the O-(2-chloroethyl)-O-methyl-S-phenyl-thiol-phosphoric acid ester. The yield is 125.8 g. (47% of the theory). The product boils at 159 to 161° C. under a pressure of 1 mm. Hg.

*Analysis.*—Calcd. for $C_9H_{12}ClO_3PS$ (molecular wt. 266.5)( percent): S, 12.0; Cl, 13.3. Found (percent): S, 12.8; Cl, 12.9.

EXAMPLE 10

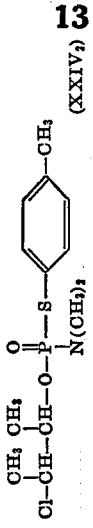

(VIIIa)

A solution of 154.5 g. (1 mol) 2-chloro-4,5-dimethyl-1,3,2-dioxaphospholane in 100 cc. dichloromethane is reacted, at 25° C., first with 189.5 g. (1 mol) 2-nitrophenyl-sulfenic acid chloride and, after the reaction mixture has stood for one hour, with methanol, as described in Example 7. The yield of O-[3-chlorobut-2-yl]-O-methyl-S-(2'-nitrophenyl)-thiol-phosphoric acid ester is 170 g. (50% of the theory).

Analysis.—Calcd. for $C_{11}H_{15}ClNO_5PS$ (molecular wt. 339.5) (percent): P, 9.1; S, 9.4. Found (percent): P, 8.7; S, 10.2.

EXAMPLE 11

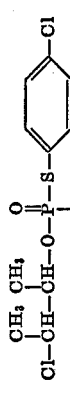

(XXIIa)

179 g. (1 mol) 4-chlorophenyl-sulfenic acid chloride are added to a solution of 154.5 g. (1 mol) 2-chloro-4,5-dimethyl - 1,3,2 - dioxaphospholane in 400 cc. dichloromethane at 25 to 30° C. After the mixture has stood for 1 hour, dimethylamine is introduced into the reaction mixture until there is a mildly alkaline reaction; the reaction mixture is then extracted with water, the organic phase is separated, dried, and the solvent is drawn off under reduced pressure. As residue, there remain behind 288 g. (84% of the theory) of O-[3-chlorobut-2-yl]-N,N-dimethylamido - S - (4'-chlorophenyl)-thiol-phosphoric acid ester.

Analysis.—Calcd. for $C_{12}H_{18}Cl_2NO_2PS$ (molecular wt. 32.0) (percent): Cl, 20.8; N, 4.1. Found (percent): Cl, 20.93; N, 4.01.

In an analogous manner, the following compound can be obtained:

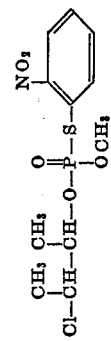

(XXIVa)

EXAMPLE 12

The following compounds are prepared by analogous methods.

| | Constitution | Empirical formula | Molecular weight | Refractive index | P Calc'd | P Found | S Calc'd | S Found | Cl Calc'd | Cl Found |
|---|---|---|---|---|---|---|---|---|---|---|
| (XXVa) | | $C_{10}H_{13}Cl_2O_3PS_2$ | 331 | $n_D^{23}=1.5866$ | 9.31 | 9.44 | 19.3 | 19.03 | 21.4 | 21.1 |
| (XXa) | | $C_{15}H_{16}ClO_3PS_2$ | 358.5 | $n_D^{23}=1.6278$ | 8.65 | 8.69 | 17.85 | 18.27 | | |
| (XXVIa) | | $C_{14}H_{22}ClO_3PS$ | 336.5 | $n_D^{24}=1.5400$ | 9.20 | 8.60 | 9.5 | 9.6 | | |
| (XXVIIa) | | $C_{10}H_{14}ClO_3PS$ | 280.5 | $n_D^{24}=1.5290$ | 11.1 | 11.5 | 11.4 | 10.9 | | |
| (XXVIIIa) | | $C_{10}H_{14}ClO_2PS_2$ | 296.5 | $n_D^{24}=1.5881$ | 10.4 | 9.9 | 21.6 | 21.7 | | |
| (XXIXa) | | $C_{11}H_{16}ClO_2PS_2$ | 310.5 | $n_D^{24}=1.5707$ | 10.0 | 10.3 | | | 11.4 | 10.9 |

| Constitution | | Empirical formula | Molecular weight | Refractive index | \multicolumn{6}{c}{Analysis, percent} |
| | | | | | P | | S | | Cl | |
| | | | | | Calc'd | Found | Calc'd | Found | Calc'd | Found |
|---|---|---|---|---|---|---|---|---|---|---|
| (XXX₁) | $CH_3$ $O$ $\\$ $\parallel$ $Cl-CH_2-CH-O-P-S-$ ⟨benzene ring⟩ $-C(CH_3)_3$ / $SCH_3$ | $C_{14}H_{19}ClO_2PS_2$ | 352.5 | $n_D^{23}=1.5565$ | 8.8 | 9.0 | 18.2 | 17.7 | | |
| (XXXI₁) | $CH_3$ $CH_3$ $O$ $Cl-CH-CH-O-P-S-$ ⟨benzene⟩ / $OC_2H_5$ | $C_{12}H_{18}ClO_3PS$ | 308.5 | | 10.1 | 10.1 | 10.4 | 10.6 | 11.5 | 11.2 |
| (XXXII₁) | $CH_3$ $CH_3$ $O$ $Cl-CH-CH-O-P-S-$ ⟨benzene⟩ / $OC_3H_7n$ | $C_{13}H_{20}ClO_3PS$ | 322.5 | | 9.7 | 9.8 | 9.9 | 10.1 | 11.0 | 11.0 |
| (XXXIII₁) | $CH_3$ $CH_3$ $O$ $Cl-CH-CH-O-P-S-$ ⟨benzene⟩ / $OC_3H_7iso$ | $C_{13}H_{20}ClO_3PS$ | 322.5 | | 9.6 | 9.9 | 9.9 | 10.1 | | |
| (XXXIV₁) | $CH_3$ $CH_3$ $O$ $Cl-CH-CH-O-P-S-$ ⟨benzene⟩ / $N(CH_3)_2$ | $C_{12}H_{19}ClNO_2PS$ | 307.5 | | | | 10.4 | 9.9 | 11.5 | 11.1 |
| (XXXV₁) | $CH_3$ $CH_3$ $O$ $Cl-CH-CH-O-P-S-$ ⟨benzene⟩ / $N(C_2H_5)_2$ | $C_{14}H_{23}ClNO_2PS$ | 335.5 | | 9.2 | 8.7 | 9.5 | 9.8 | | |
| (XXXVI₁) | $CH_3$ $O$ $Cl-CH_2-CH-O-P-S-$ ⟨benzene⟩ / $OCH_3$ | $C_{10}H_{14}ClO_3PS$ | 280.5 | $n_D^{23}=1.5421$ | 11.1 | 11.1 | 11.5 | 11.5 | 12.7 | 12.5 |
| (XXXVII₁) | $CH_3$ $O$ $Cl-CH_2-CH-O-P-S-$ ⟨benzene⟩ / $OC_2H_5$ | $C_{11}H_{16}ClO_3PS$ | 294.5 | $n_D^{23}=1.5329$ | 10.5 | 10.8 | 10.9 | 11.0 | 12.0 | 12.0 |
| (XXXVIII₁) | $CH_3$ $O$ $Cl-CH_2-CH-O-P-S-$ ⟨benzene⟩ / $OC_3H_7n$ | $C_{12}H_{18}ClO_3PS$ | 308.5 | $n_D^{23}=1.5258$ | | | 10.4 | 10.3 | 11.5 | 11.2 |
| (XXXIX₁) | $CH_3$ $O$ $Cl-CH_2-CH-O-P-S-$ ⟨benzene⟩ / $OC_3H_7iso$ | $C_{12}H_{18}ClO_3PS$ | 308.5 | $n_D^{23}=1.5292$ | 10.0 | 10.5 | 10.4 | 10.4 | | |
| (XL₁) | $CH_3$ $O$ $Cl-CH_2-CH-O-P-S-$ ⟨benzene⟩$-Cl$ / $S-$ ⟨benzene⟩ | $C_{15}H_{15}Cl_2O_2PS_2$ | 393 | $n_D^{23}=1.6083$ | 7.9 | 8.2 | 16.3 | 16.0 | 18.1 | 18.1 |

| | Constitution | Empirical formula | Molecular weight | Refractive index | P Calc'd | P Found | S Calc'd | S Found | Cl Calc'd | Cl Found |
|---|---|---|---|---|---|---|---|---|---|---|
| (XLI₁) | CH₃<br>Cl—CH₂—CH—O—P(=O)(N(CH₃)₂)—S—C₆H₅ | C₁₁H₁₇ClNO₂PS | 293.5 | $n_D^{23}=1.5418$ | | | 10.9 | 10.9 | 12.1 | 12.1 |
| (XLII₁) | CH₃<br>Cl—CH₂—CH—O—P(=O)(OCH₃)—S—C₆H₄Cl | C₁₀H₁₃Cl₂O₃PS | 315 | $n_D^{23}=1.5567$ | 9.9 | 9.9 | 10.2 | 10.3 | 22.5 | 22.8 |
| (XLIII₁) | CH₃<br>Cl—CH₂—CH—O—P(=O)(OC₂H₅)—S—C₆H₄Cl | C₁₁H₁₅Cl₂O₃PS | 329 | $n_D^{23}=1.5472$ | 9.4 | 9.9 | 9.7 | 9.6 | | |
| (XLIV₁) | CH₃<br>Cl—CH₂—CH—O—P(=O)(OC₃H₇n)—S—C₆H₄Cl | C₁₂H₁₇Cl₂O₃PS | 343 | $n_D^{23}=1.5395$ | | | 9.3 | 9.1 | 20.7 | 21.2 |
| (XLV₁) | CH₃<br>Cl—CH₂—CH—O—P(=O)(OC₃H₇iso)—S—C₆H₄Cl | C₁₂H₁₇Cl₂O₃PS | 343 | $n_D^{23}=1.5418$ | | | 9.3 | 9.1 | 20.7 | 20.8 |
| (XLVI₁) | CH₃<br>Cl—CH₂—CH—O—P(=O)(N(CH₃)₂)—S—C₆H₄Cl | C₁₁H₁₆Cl₂NO₂PS | 328 | $n_D^{23}=1.5570$ | 9.5 | 9.8 | 9.8 | 9.5 | | |
| (XLVII₁) | CH₃<br>Cl—CH₂—CH—O—P(=O)(OCH₃)—S—C₆H₄CH₃ | C₁₁H₁₆ClO₃PS | 294.5 | $n_D^{23}=1.5387$ | 10.5 | 10.5 | 10.9 | 10.7 | 12.1 | 12.1 |
| (XLVIII₁) | CH₃<br>Cl—CH₂—CH—O—P(=O)(OC₂H₅)—S—C₆H₄CH₃ | C₁₂H₁₈ClO₃PS | 308.5 | $n_D^{23}=1.5314$ | 10.0 | 10.3 | 10.3 | 10.2 | | |
| (XLIX₁) | CH₃<br>Cl—CH₂—CH—O—P(=O)(OC₃H₇n)—S—C₆H₄CH₃ | C₁₃H₂₀ClO₃PS | 322.5 | $n_D^{23}=1.5263$ | | | 9.9 | 9.8 | 11.0 | 11.0 |
| (L₁) | CH₃<br>Cl—CH₂—CH—O—P(=O)(OC₃H₇iso)—S—C₆H₄CH₃ | C₁₃H₂₀ClO₃PS | 322.5 | $n_D^{23}=1.5318$ | 9.6 | 9.7 | 9.9 | 10.0 | | |
| (LI₁) | CH₃<br>Cl—CH₂—CH—O—P(=O)(N(CH₃)₂)—S—C₆H₄CH₃ | C₁₂H₁₉ClNO₂PS | 307.5 | $n_D^{23}=1.5410$ | 10.1 | 10.4 | 10.4 | 10.4 | | |

| Constitution | Empirical formula | Molecular weight | Refractive index | P Cal'd | P Found | S Cal'd | S Found | Cl Cal'd | Cl Found |
|---|---|---|---|---|---|---|---|---|---|
| (LII) CH₃, Cl-CH₂-CH-O, nC₄H₉-S, P=O, S-⟨C₆H₄⟩-Cl | C₁₃H₁₉O₂Cl₃S₂P | 373 | $n_D^{30}=1.5694$ | | | 17.2 | 17.7 | 19.1 | 18.9 |
| (LIII) CH₃, Cl-CH₂-CH-O, CH₃-O, P=O, S-⟨C₆H₄⟩-Cl | C₁₁H₁₅O₃Cl₃S₂P | 345 | $n_D^{31}=1.5832$ | 9.0 | 9.2 | 18.6 | 18.7 | 20.6 | 20.6 |
| (LIV) CH₃, Cl-CH₂-CH-O, CH₃-S, P=O, S-⟨C₆H₃(CH₃)⟩ | C₁₁H₁₆O₂Cl₂S₂P | 311 | $n_D^{22}=1.5709$ | 10.0 | 10.14 | 20.6 | 19.9 | 11.4 | 10.78 |
| (LV) CH₃, Cl-CH₂-CH-O, CH₃-S, P=O, S-⟨C₆H₄⟩-Br | C₁₁H₁₅O₂ClBrS₂P | 390 | $n_D^{22}=1.5964$ | 7.95 | 7.98 | 16.4 | 16.41 | 8.9 | |
| (LVI) (Cl-CH₂)₂CH-O, CH₃-S, P=O, S-⟨C₆H₅⟩ | C₁₀H₁₃O₂Cl₂S₂P | 331 | $n_D^{22}=1.6335$ | 9.4 | 8.8 | 19.35 | 18.5 | | |
| (LVII) Cl-CH₂-CH₂-CH₂-O, CH₃-S, P=O, S-⟨C₆H₅⟩ | C₁₀H₁₄O₂ClS₂P | 331 | $n_D^{20}=1.5915$ | 9.4 | 9.5 | 19.3 | 19.1 | | |
| (LVIII) CH₃, CH₃, Cl-CH₂-CH-CH-O, CH₃-S, P=O, S-⟨C₆H₄⟩-Cl | C₁₁H₁₆O₂Cl₂S₂P | 373 | $n_D^{23}=1.5706$ | 8.3 | 8.0 | | | | |
| (LIX) CH₃, CH₃, Cl-CH-CH-O, O=P, CH₃-S, O-⟨C₆H₅⟩, OCH₃ | C₁₁H₁₆O₄ClSP | 294.5 | | 10.5 | 10.33 | 10.85 | 11.45 | 12.05 | 12.26 |

Advantageously, in accordance with the present invention, in the foregoing formulae:

$R_1$, $R_2$, $R_3$, $R_4$, $R_5$ and $R_6$, each respectively, represents hydrogen, and alkyl having 1–4 carbon atoms, such as methyl, ethyl, n-propyl, isopropyl, n-butyl, isobutyl, sec.-butyl, tert.-butyl, and the like, especially methyl, ethyl, n-propyl, isopropyl, n-butyl, isobutyl, and sec.-butyl, and particularly methyl;

$R_7$ and $R_8$, each respectively, represents
straight and branch alkyl having 1–6 carbon atoms, including methyl to tert.-butyl inclusive, as defined above, n-, iso- and tert.-amyl, n-hexyl, 1,2,2-trimethyl-propyl, pinacolyl, etc., and the like, especially $C_{1-4}$ alkyl;
cycloalkyl including cycloalkyl having 5–6 ring carbon atoms, such as cyclopentyl, cyclohexyl, and the like, especially cyclohexyl;

Phenyl; and substituted phenyl which is substituted with 1–3 substituents, including mixed substituents such as chloro; lower alkyl, especially $C_{1-4}$ alkyl, more especially methyl to tert.-butyl inclusive as defined above; nitro; and/or lower alkyl mercapto, especially $C_{1-4}$ alkyl-mercapto, more especially methyl to tert.-butyl inclusive, as defined above, -mercapto, and particularly 1–2 such substituents and mixtures of two such substituents;

X is oxygen;
Y is oxygen or sulfur; and $n$ is a whole number from 0 to 1;

with the proviso that Y and $R_8$ when taken together form N-lower alkyl and N,N-dilower alkyl, especially with each such lower alkyl radical respectively being $C_{1-4}$ alkyl such as methyl to tert.-butyl inclusive as defined above, and particularly di-$C_{1-4}$ alkyl.

Preferably, $R_1$ and $R_5$ are hydrogen or $C_{1-4}$ alkyl; $R_2$, $R_3$, $R_4$ and $R_6$ are hydrogen; $R_7$ is $C_{1-6}$ alkyl, phenyl, chlorophenyl, lower alkyl-, especially $C_{1-4}$ alkyl-, -phenyl, nitrophenyl, lower alkylmercapto-, especially $C_{1-4}$ alkyl mercapto-, -phenyl, and mixed said lower alkyl- and lower alkylmercapto-phenyl, and particularly $C_{1-6}$ alkyl, phenyl, chlorophenyl, $C_{1-4}$ alkylphenyl and nitrophenyl; whereas $R_8$ is $C_{1-6}$ alkyl, $C_{5-6}$ cycloalkyl, especially when Y is oxygen, phenyl, chlorophenyl, especially when Y is sulfur, lower alkyl-, especially $C_{1-4}$ alkyl-, -phenyl, especially when Y is oxygen, nitro-phenyl, especially when Y is oxygen, lower alkylmercapto-, especially $C_{1-4}$ alkylmercapto-, -phenyl, especially when Y is oxygen, and mixed said lower alkyl- and lower alkylmercapto- -phenyl, and particularly $C_{1-6}$ alkyl, $C_{5-6}$ cycloalkyl, phenyl, $C_{1-4}$ alkyl- $C_{1-4}$ alkylmercapto-phenyl and nitrophenyl when Y is oxygen, and $C_{1-6}$ alkyl, phenyl and chlorophenyl when Y is sulfur. Moreover, when Y and $R_8$ together represent N- and N,N-di-alkylamino, such amino is preferably N,N-di-$C_{1-4}$ alkylamino.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be realized also that the instant O-chloroalkyl-S-(alkyl, cycloalkyl, phenyl and substituted phenyl)-thiolphosphoric acid diester chlorides may also be obtained in accordance with the disclosure of U.S. Pat. 3,626,039, which is a continuation-in-part of said U.S. Ser. No. 704,515, filed Feb. 12, 1968, now abandoned.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A fungicidal composition comprising a mixture of a dispersible carrier vehicle and a fungicidally effective amount between about 0.00001–95% by weight of the mixture of an ester of the formula

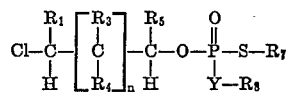

in which $R_1$, $R_3$, $R_4$ and $R_5$, each respectively, is selected from the group consisting of hydrogen, alkyl, chloroalkyl and bromoalkyl of 1–4 carbon atoms, $R_7$ and $R_8$, each respectively, is selected from the group consisting of alkyl having 1–6 carbon atoms, which may be substituted by 1 to 3 chlorine or bromine atoms, and mixtures of such substituents, cycloalkyl having 5 to 6 ring carbon atoms, phenyl and substituted phenyl which is substituted with 1–3 substituents selected from the group consisting of alkyl of 1–4 carbon atoms, chloro, bromo, nitro, methylmercapto, and mixtures of such substituents, with the proviso, however, that one and only one of the substituents $R_7$ or $R_8$ is phenyl or optionally substituted phenyl, Y is selected from the group consisting of oxygen and sulfur, with the proviso that Y must not be oxygen, if $R_8$ is alkyl or cycloalkyl and Y and $R_8$ when taken together, represents a dialkylamino group, and $n$ is a whole number from 0 to 1.

2. A method of combating fungi comprising applying to such fungi or their habitat a fungicidally effective amount of a compound of the formula:

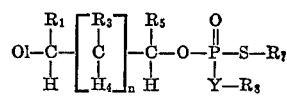

in which $R_1$, $R_3$, $R_4$ and $R_5$, each respectively, is selected from the group consisting of hydrogen, alkyl, chloroalkyl and bromoalkyl of 1–4 carbon atoms, $R_7$ and $R_8$, each respectively, is selected from the group consisting of alkyl having 1–6 carbon atoms, which may be substituted by 1 to 3 chlorine or bromine atoms, and mixtures of such substituents, cycloalkyl having 5 to 6 ring carbon atoms, phenyl and substituted phenyl which is substituted with 1–3 substituents selected from the group consisting of alkyl of 1–4 carbon atoms, chloro, bromo, nitro, methylmercapto, and mixtures of such substituents, with the proviso, however, that one and only one of the substituents $R_7$ or $R_8$ is phenyl or optionally substituted phenyl, Y is selected from the group consisting of oxygen and sulfur, with the proviso that Y must not be oxygen, if $R_8$ is alkyl or cycloalkyl and Y and $R_8$ when taken together, represents a dialkylamino group, and $n$ is a whole number from 0 to 1.

3. The method of claim 2 wherein the compound is used in the form of a mixture with a dispersible carrier vehicle, said compound being present in a fungicidally effective amount and constituting substantially between about 0.00001–20% by weight of the mixture.

4. The method of claim 2 wherein the compound is selected from the group consisting of O-methyl-O-(3-chlorobut-2-yl)-S-phenyl-thiol-phosphoric acid ester;
O-(1-chloroprop-2-yl)-S-methyl-S-(4'-chlorophenyl)-dithiol-phosphoric acid ester;
O-(1-chloroprop-2-yl)-S-methyl-S-(2'-methyl-phenyl)-dithiol-phosphoric acid ester;
O-(2-chloroprop-2-yl)-S-methyl-S-phenyl-dithiol-phosphoric acid ester and
O-(1,3-dichloroprop-2-yl)-S-methyl-S-phenyl-dithiol-phosphoric acid ester.

5. The method of claim 2 wherein the compound is O-methyl - O - (3-chloro-but-2-yl)-S-phenyl-thiolphosphoric acid ester having the formula

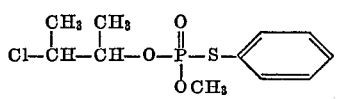

6. The method of claim 2 wherein the compound is O-(1 - chloroprop - 2 - yl)-S-methyl-S-(4'-chlorophenyl)-dithiolphosphoric acid ester having the formula

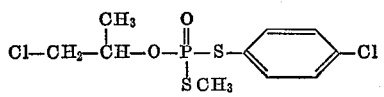

7. The method of claim 2 wherein the compound is O-(1 - chloroprop - 2 - yl)-S-methyl-S-(2'-methylphenyl)-dithiolphosphoric acid ester having the formula

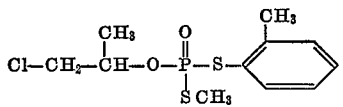

8. The method of claim 2 wherein the compound is O-(1 - chloroprop - 2 - yl)-S-methyl-S-phenyl-dithiol-phosphoric acid ester having the formula

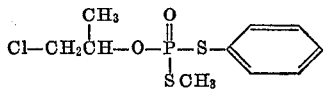

9. The method of claim 2 wherein the compound is O-(1,3 - dichloro - prop - 2 - yl)-S-methyl-S-phenyl-dithiol-phosphoric acid ester having the formula

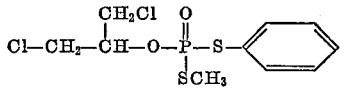

References Cited
UNITED STATES PATENTS 3,087,955   4/1963   Brust _____ 260—959

FOREIGN PATENTS 1,419,606   1965   France _____ 260—959
6,611,860   1967   Netherlands _____ 260—959

ALBERT T. MEYERS, Primary Examiner
L. SCHENKMAN, Assistant Examiner

U.S. Cl. X.R.

424—215, 218, 220

UNITED STATES PATENT OFFICE
CERTIFICATE OF CORRECTION

Patent No. 3,743,729   Dated July 3, 1973

Inventor(s) Hellmut Hoffmann et al

It is certified that error appears in the above-identified patent and that said Letters Patent are hereby corrected as shown below:

Col. 9, Table 1, Compound (XXII$_1$), should read as follows:

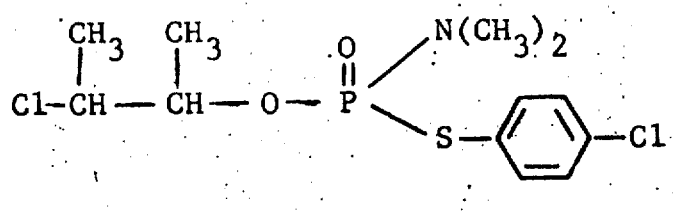

Col. 9, lines 50-51, correct spelling of "limitation".

Col. 11, line 12, correct spelling of "heated".

Col. 12, line 12, change "(51% of the theory." to --(51% of the theory). --.

Col. 12, line 20 - Example 7, the formula should read as follows

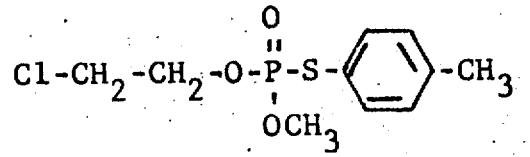

Col. 15 & 16, in the Table, under heading "Constitution" Compound (XXXIII$_1$) should read as follows:

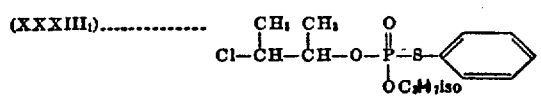

UNITED STATES PATENT OFFICE
CERTIFICATE OF CORRECTION

Patent No. 3,743,729         Dated July 3, 1973

Inventor(s)  Hellmut Hoffmann et al         Page 2

It is certified that error appears in the above-identified patent and that said Letters Patent are hereby corrected as shown below:

Col. 22, claim 2, change formula to read as follows:

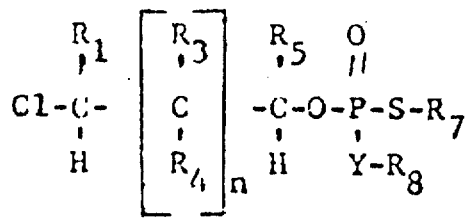

Signed and sealed this 26th day of February 1974.

(SEAL)
Attest:

EDWARD M. FLETCHER, JR.
Attesting Officer

C. MARSHALL DANN
Commissioner of Patents